United States Patent [19]

Donovan

[11] Patent Number: 4,780,084
[45] Date of Patent: Oct. 25, 1988

[54] LANDMASS SIMULATOR

[75] Inventor: Kenneth B. Donovan, Daytona Beach, Fla.

[73] Assignee: General Electric Company, Phildelphia, Pa.

[21] Appl. No.: 47,310

[22] Filed: May 8, 1987

[51] Int. Cl.$^4$ .............................. G09B 5/02
[52] U.S. Cl. ......................................... 434/2
[58] Field of Search ......................... 434/1–10; 342/176, 179

[56] References Cited

U.S. PATENT DOCUMENTS

| | | | |
|---|---|---|---|
| 2,788,588 | 4/1957 | Lindley | 434/4 |
| 2,994,966 | 8/1961 | Senitsky et al. | 434/2 |
| 3,018,478 | 1/1962 | Skillman et al. | 434/2 X |
| 3,067,525 | 12/1962 | Thom | 434/4 |
| 3,883,861 | 5/1975 | Heartz | 434/2 X |
| 4,017,985 | 4/1977 | Heartz | 434/2 |
| 4,198,762 | 4/1980 | Lamasney et al. | 434/3 |
| 4,667,199 | 5/1987 | Roberts | 434/2 X |

Primary Examiner—Theodore M. Blum
Assistant Examiner—Bernarr Earl Gregory
Attorney, Agent, or Firm—Stephen A. Young; Paul Checkovich

[57] ABSTRACT

The areal height and areal reflectivity of source data for defining a landmass are modified in real time in response to the areal reflectivity of the source data, so that the modified values may be processed for generating radar images to be displayed. The images may include stationary three-dimensional features, useful for a high resolution radar, without need to preprocess data or increase bulk storage medium size of landmass data. In addition, the features, which may include industrial, forestial, commercial and/or residential areas, and/or specific detail such as a predetermined airport, may be predeterminedly disposed within a landmass area more realistically to present an image that is to be expected from an actual operating environment.

16 Claims, 3 Drawing Sheets

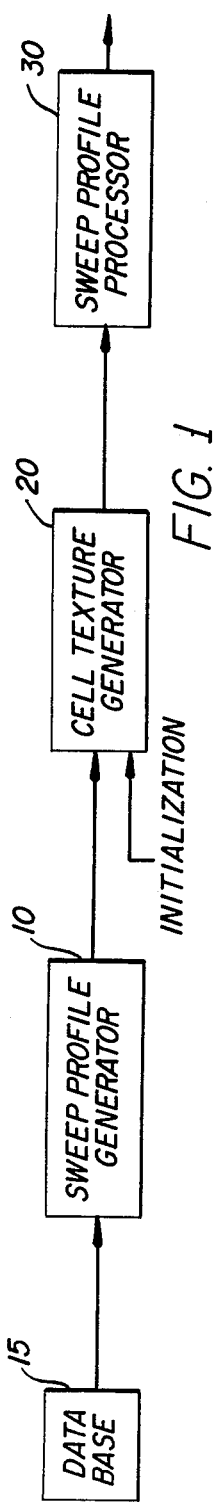
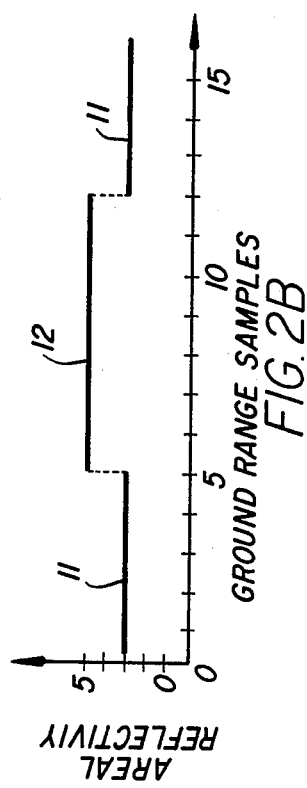
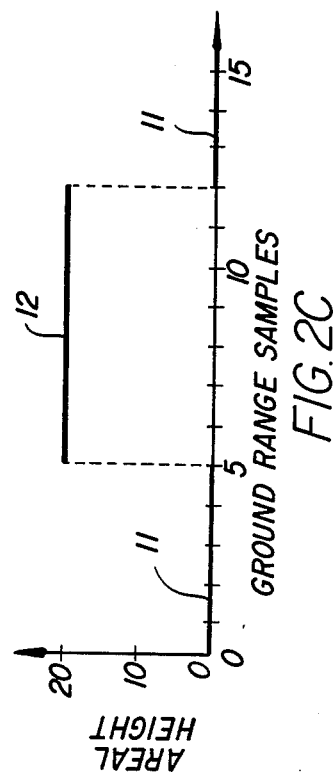
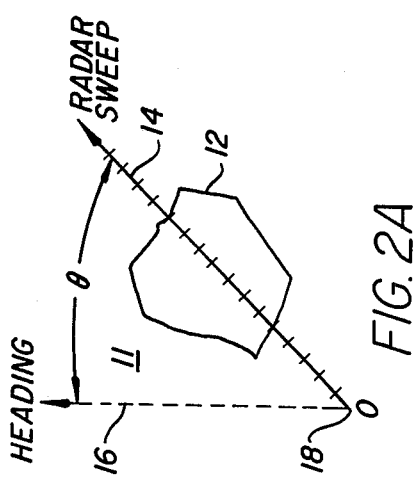

LANDMASS SIMULATOR

BACKGROUND OF THE INVENTION

This invention relates to a landmass simulator, and, more particularly, to a real-time landmass or terrain simulator that provides stationary and three-dimensional detail so that it may be used effectively for radar training especially in the use of a high resolution radar.

One source of terrain descriptions is the Defense Mapping Agency which digitizes topographic regions by outlining areas (such as industrial, residential and forestial) having a similar composition and makes available the resulting data base. These areal, i.e. having an area, features are typically defined by polygons with a predominant composition and specified height. One problem with trying to simulate these areal features is that on prior displays they appear like large, solid polygons, potentially several square miles in area, and thus seem artificial.

A radar landmass or terrain simulator is described and claimed in U.S. Pat. No. 4,168,582—Heidrich, assigned to the instant assignee. Although the images produced in accordance with the teachings of Heidrich satisfy training criteria for certain classes of radar, generally of lower resolution, they are not especially well suited for displaying stationary real-time fine detail that is desired for comprehensive training on high-resolution radars. In order to provide images useful for training on a high-resolution radar, it is necessary that the detail remain stationary, i.e. does not shift position in the landmass representation as the simulated radar position or sweep changes. In addition, it would be desirable to be able to present three dimensional features that more nearly represent images to be expected from processing actual radar return signals. Further, it would be desirable to incorporate high detail source images, such as obtained from aerial photographs and/or satellite sensors, for specific world areas, like an airport or city, along with the topographic data base of the surrounding area for producing high fidelity simulated radar images of the specific world areas.

It may be possible to introduce desired data descriptors into the data base by using an off-line operation. Problems with such schemes include the necessity to perform pre-processing (i.e. storage of the desired data in the data base so that the features they define are recalled in the appropriate position of the landmass) and the increased bulk storage size, e.g. disk or magnetic tape, required for storing the additional pre-processed information.

Accordingly, it is an object of the present invention to provide a landmass simulator for generating fine detailed images for a high-resolution radar.

Another object is to present images exhibiting three-dimensional features for high-resolution radar.

A further object is to present images for high resolution radar without need to preprocess data.

Still another object is to avoid increasing the size of the bulk storage medium required for the topographic data base.

Yet another object is to present images wherein the detail remains stationary regardless of the orientation of the radar.

An additional object is to present images wherein high resolution detail of specific areals, like an airport, may be readily incorporated along with detail from a topographic data base of the surrounding area.

SUMMARY OF THE INVENTION

In accordance with the present invention, a method for creating image data for defining images to be displayed in a radar image generation system comprises obtaining source data for defining a feature of an image to be displayed, wherein the source data include height and reflectivity information, modifying in real time the height and reflectivity portion of the source data in response to the value of the reflectivity of the source data, and providing the modified height and reflectivity portion of the source data for processing so that the images to be displayed may be developed therefrom.

Also, in accordance with the present invention a method for simulating images to be displayed comprises obtaining source data for defining a feature of an image to be displayed, wherein the source data include height and reflectivity information, modifying in real time the height and reflectivity portion of the source data in response to the value of the reflectivity of the source data, and processing the modified height and reflectivity portion of the source data for generating the images to be displayed. The method may further include identifying one of a plurality of patterns representative of a respective three-dimensional areal type in response to the reflectivity portion of the source data, selecting a predetermined portion of one of the patterns in response to the location of a ground sample of a radar sweep, and varying the height and reflectivity portion of the source data in response to the selected portion of the pattern.

Further, in accordance with the present invention, apparatus for simulating images to be displayed in a radar image generation system comprises cell texture generator means for modifying in real time the areal height and areal reflectivity portion of source data, wherein the source data include areal height and reflectivity information for defining features includable in the images to be displayed, and sweep profile processor means coupled to the texture generator for simulating the images to be displayed in response to the modified areal height and areal reflectivity portion of the source data. The cell texture generator means may include pattern storage means for storing a plurality of patterns, each pattern representative of a respective three-dimensional areal type and pattern select means coupled to the pattern storage means for identifying one of the plurality of patterns in response to the areal reflectivity portion of the source data, wherein the areal reflectivity and areal height of the source data are modified in response to the identified one of the patterns.

In another embodiment, the cell texture generator means comprise sub-pattern level storage means for storing a plurality of sub-patterns, wherein each of the plurality of sub-patterns is representative of a respective terrain grid and include corresponding height and reflectivity information, pattern level storage means coupled to the sub-pattern level storage for selecting one of the plurality of sub-patterns, wherein the pattern level storage means include a plurality of patterns, each of the plurality of patterns representative of a respective arrangement of sub-patterns, pattern select means for identifying one of the plurality of patterns in response to the areal reflectivity portion of the source data, and pattern position accuulator means coupled to the pattern and sub-pattern level storage means and responsive to the location of a ground sample of a radar sweep for selecting a corresponding portion of the identified one of the plurality of patterns and for selecting a portion of the one of the plurality of sub-patterns, wherein the areal reflectivity and areal height of the source data are modified in response to the selected portion of the one of the plurality of sub-patterns.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 1 is a block diagram of an image generation system in accordance with the present invention.

FIG. 2A is a partial plan or PPI (plan position indicator) view of an areal feature with a superimposed radar sweep.

FIGS. 2B and 2C are representative areal reflectivity and areal height, respectively, along the radar sweep of FIG. 2A.

DETAILED DESCRIPTION

Figure 3:
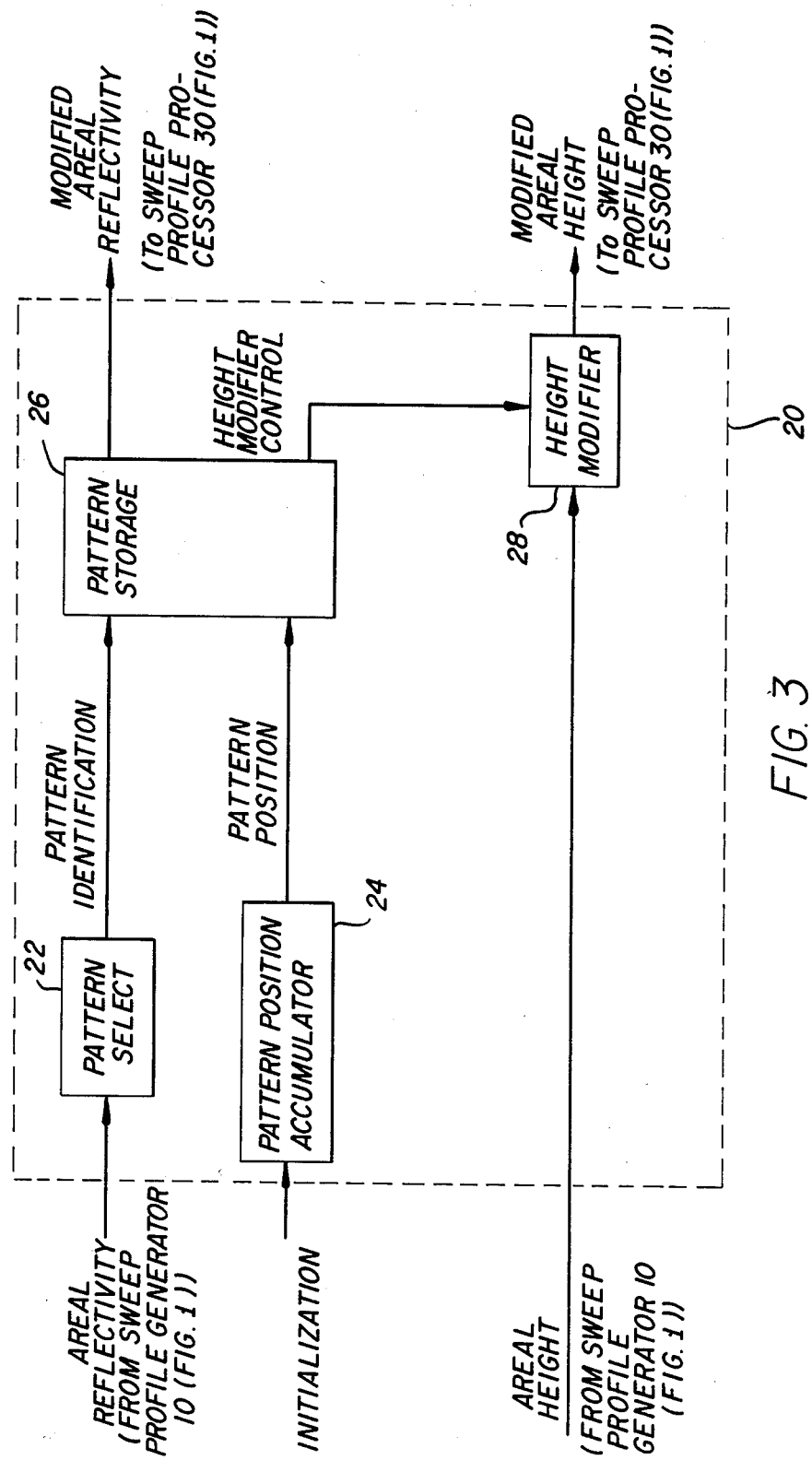
FIG. 3 is a block diagram of the cell texture generator of FIG. 1 in accordance with the present invention.

Referring to FIG. 1, a block diagram of an image generation system in accordance with the present invention is shown. The system includes a sweep profile generator 10 for identifying landmass features that are illuminated along a simulated radar sweep and having an output coupled to an input of a cell texture generator 20 which includes an output coupled to an input of a sweep profile processor 30. Briefly, cell texture generator 20 disposes generic detail such as represents forests, fields, city blocks, and residential or commercial areas and/or specific detail such as represents buildings, streets, bridges, towers, and airports to appear in appropriate positions within the landmass features whose descriptors are received from sweep profile generator 10. A topographic data base 15, having terrain and landmass descriptors, like those available from the Defense Mapping Agency, stored in a bulk storage medium includes an output coupled to an input of sweep profile generator 10. Although signal transfer paths among data base 15, profile generator 10, texture generator 20 and profile processor 30 are shown as a single line, it is to be understood that parallel paths for increased efficiency and throughput may be used where desired. In addition, a master timing and synchronization circuit (not shown) includes an output coupled to each component shown in FIG. 1, for coordinating and synchronizing data transfers as is known in the art.

Sweep profile generator 10 accepts terrain data descriptors with respect to a predetermined reference location from data base 15. Typically the predetermined reference location is the position of the radar for which video returns are to be simulated. The radar may be considered to scan cyclically in azimuth, either circularly or in a sector scan mode. Data descriptors from data base 15 define peak and valley lines or coordinates (i.e. areal height profile) of the terrain whose radar image is to be simulated, as well as provide an indication of radar reflectivity of the various surfaces of the terrain and an identification of the nature of the terrain. A PPI presentation device (not shown) may be coupled to sweep profile processor 30 and include means for producing a sweep in range from an origin representing the location of the radar system being simulated. By data processing equipment that includes sweep profile processor 30, the intensity of the radar return signal from each part of the simulated terrain is calculated and the presentation is illuminated correspondingly. More detailed description relating to the fabrication and operation of sweep profile generator 10 and sweep profile processor 30 may be obtained from the aboveidentified patent to Heidrich.

Referring to FIGS. 2A, 2B and 2C, a partial PPI presentation including an areal feature along with associated reflectivity and height profiles are shown. A radar sweep 14 is displaced $\theta$ degrees from a reference or heading vector 16. The origin 18 of sweep 14 corresponds to the position of the radar for which the display is being simulated. When the radar is mounted on a moveable platform such as an airframe, vehicle or vessel, then heading 16 may be the direction of motion of the platform so that angle $\theta$ represents the relative bearing of radar sweep 14.

An areal feature 12, such as a landmass, is distinguishable from the background environment 11 which may include other land, water or a combination of both. FIGS. 2B and 2C illustrate the areal reflectivity and areal height, respectively, along radar sweep 14 of FIG. 2A at corresponding ground range sample intervals represented by the small lines crossing sweep 14. As shown, background 11 has an areal reflectivity of three units while areal feature 12 has a reflectivity of five units along radar sweep 14. In addition, background 11 has a relative (or absolute if appropriately calibrated) areal height of zero units and areal feature 12 has an areal height of twenty units along radar sweep 14. In FIGS. 2B and 2C the areal reflectivity and areal height of areal feature 12 is constant along radar sweep 14, although one or both need not be so. Thus, for each angular position of radar sweep 14 and for each range increment along radar sweep 14, at each angular position of sweep 14, the areal reflectivity and height information corresponding to areal features along sweep 14 are available at the output of sweep profile generator 10 (FIG. 1).

Referring again to FIG. 1, the areal height and reflectivity as determined by sweep generator 10 are provided to cell texture generator 20. Also supplied to texture generator 20 is an initialization signal whose function is described in detail below. Cell texture generator 20 modifies or substitutes a predetermined value for the areal height and/or reflectivity signals that are received from sweep profile generator 10 in accordance with the present invention. Additional functions, operation and structure of cell texture generator 20 is provided along with the description of FIGS. 3 and 4 below.

Signals representative of the modified areal height and reflectivity, which are preferably in digital form, are supplied to sweep profile processor 30. Sweep profile processor 30 operates on the data provided thereto for simulating the portion of a radiated radar signal returned to the radar receiver (not shown) and for developing corresponding video for display as is known in the art.

Referring to FIG. 3, cell texture generator 20 is shown. Texture generator 20 includes a pattern select circuit 22 having an input constituting an input of texture generator 20 for receiving the areal reflectivity signal from sweep profile generator 10 (FIG. 1) and an output for providing a pattern identification signal coupled to an input of a pattern storage means 26. A pattern position accumulator 24 has an input constituting another input of texture generator 20 for receiving the initialization signal and an output, for providing a pattern position signal, coupled to another input of pattern storage means 26. A height modifier circuit 28 includes an input constituting yet another input of texture generator 20 for receiving the areal height signal from sweep profile generator 10 (FIG. 1) and an output, constituting an output of cell texture generator 20, for providing a modified areal height signal to sweep profile processor 30 (FIG. 1) in response to a height modifier control signal supplied to another input of height modifier circuit 28 from an output of pattern storage means 26. Pattern storage means 26 includes another output, which constitutes another output of cell texture generator 20, for supplying the modified areal reflectivity signal to sweep profile processor 30 (FIG. 1).

Pattern select means 22 and pattern storage means 26 may each include a respective table look-up having predetermined data stored therein. An element of the predetermined data is provided to the output of the table look-up in response to an address or code provided to the input of the table look-up. The table look-up may be conveniently stored in a programmable read-only-memory (PROM) or random access memory (RAM).

Operation of cell texture generator 20 is as follows. Areal reflectivity information from profile generator 10 (FIG. 1) is provided to an input of pattern select means 22. The areal reflectivity is used to access pattern select circuitry for obtaining a pattern identification value. The pattern identification value is supplied to one input of pattern storage means 26.

As an example, when pattern select means 22 includes a table look-up, the areal reflectivity signal supplied to select means 22 may be used to address the look-up table. The output from the look-up table, which may constitute the output of select means 22, is supplied to pattern storage means 26 for indicating in response to the areal reflectivity signal supplied to select means 22 where a pattern is stored in or which pattern is to be selected from pattern storage means 26.

Initialization information provided to pattern position accumulator 24 includes the initial or actual position defined in terms of an X, Y coordinate pair of the pattern within the landmass area, a delta X position coordinate increment and a delta Y position coordinate increment. The delta X and Y position coordinates define corresponding range increments along sweep 14 (FIG. 2A) from the initial X, Y position. Pattern position accumulator 24 supplies a pattern position or address within the pattern, such as in the form of an X, Y coordinate position, to another input of pattern storage means 26.

Pattern storage means 26 may include a plurality of cell patterns or grid representations of areal types, such as industrial, commercial, residential, forestial, orchard, etc., that are representative of terrain to be expected in an actual environment. The cell pattern or grid representation may be considered analogous to a plan view of a pattern shape which includes appropriate height and reflectivity information. When pattern storage means 26 includes a RAM for storing patterns, cell patterns of the RAM may be updated or changed as required during real time operation, whenever the simulated radar position changes relative to the image to be displayed so that different generic or specific cell patterns are required. For instance, it may be necessary to change cell patterns in real time for accommodating a change in simulated radar position related to the image to be displayed when the simulated radar position moves beyond the maximum radar range for detecting a landmass having one of the cell patterns that were previously stored. For each ground range sample along sweep 14 (FIG. 2A) pattern position accumulator 24 computes the X, Y coordinates of the ground range sample of sweep 14. The original reflectivity of the ground range sample, which is provided to pattern select means 22 by the areal reflectivity signal, is used to address the table look-up of pattern select means 22 for determining the value of the pattern identification signal for the range sample. One of the grid representations of storage means 26 is selected in response to the pattern identification signal and one grid element of the selected grid representation is identified in response to the pattern position signal. Each grid element has a reflectivity value and a height modifier value associated therewith. Pattern storage means 26 supplies the modified areal reflectivity and height modifier control signals in response to the reflectivity value and height modifier value of the grid element identified. The value of the modified areal reflectivity signal is the reflectivity value of the grid element corresponding to the X, Y coordinate pair and the value of the height modifier control signal is the height value of the grid element corresponding to the X, Y coordinate pair. The same grid representation may be used more than once i.e. be selected for different values of the areal reflectivity signal. However, the image ultimately displayed may not appear the same since the value of the areal height signal corresponding to different values of the areal reflectivity signals is generally not the same.

Object profiles are added to areal features so that the resulting image is representative of real world structures expected to be found in the same type of areal feature. The three-dimensional detail added to an areal feature in accordance with the present invention makes a large areal feature, which would be depicted from unmodified data from a data base, appear like smaller differentiated areas in the radar image ultimately to be displayed. This is more representative of what is to be expected from an actual operating environment and thus provides more realistic training cues.

Pattern storage means 26 has available at one output thereof a modified or enhanced areal reflectivity signal that is supplied to sweep profile processor 30 (FIG. 1). Storage means 26 also provides a height modifier control signal that is available at another output thereof and is supplied to height modifier means 28. The other input to height modifier means 28 is the areal height signal obtained from sweep profile generator 10 (FIG. 1). In response to the height modifier control signal, height modifier means 28 operates on the areal height signal provided thereto to produce a modified or enhanced areal height signal that is available at the output thereof.

The height modifier control signal from pattern storage means 26 that is supplied in response to the pattern identification and pattern position signals is used internally by height modifier means 28 to determine the three-dimensional characteristic that is communicated by the modified areal height signal to sweep profile processor 30 (FIG. 1). For instance, height modifier means 28 may multiply the areal height signal by a respective predetermined percentage, say in the range of 0–200%, in response to the value of the height modifier control signal for each range sample for generating the corresponding modified areal height signal for each range sample. Alternatively, height modifier means 28 may add (or subtract) a predetermined value from the areal height signal in response to the value of the height modifier control signal of the respective ground sample for generating the corresponding modified areal height signal. For example, the areal height signal may indicate a feature such as grass at a height of zero feet with the height modifier control signal indicating that a predetermined height, say five feet, is to be added. The desired pattern is introduced into data signals from sweep generator 10 (FIG. 1) in real-time and therefore all data supplied to texture generator 20 is affected.

The modified areal reflectivity signal and the modified areal height signal are supplied to sweep profile processor 30 (FIG. 1) for further processing, ultimately to produce a simulated radar image in response to the modified areal reflectivity and height signals provided thereto. Operation of cell texture generator 20 ensures that the resulting pattern obtained from processing the modified areal reflectivity and height signals is stationary in the scene, and with respect to the observer, regardless of the position of the viewpoint, since the patterns supplied are treated as actual features in the landmass representation that is obtained from data base 15 (FIG. 1). Further, no preprocessing of data is performed or required.

Figure 4:
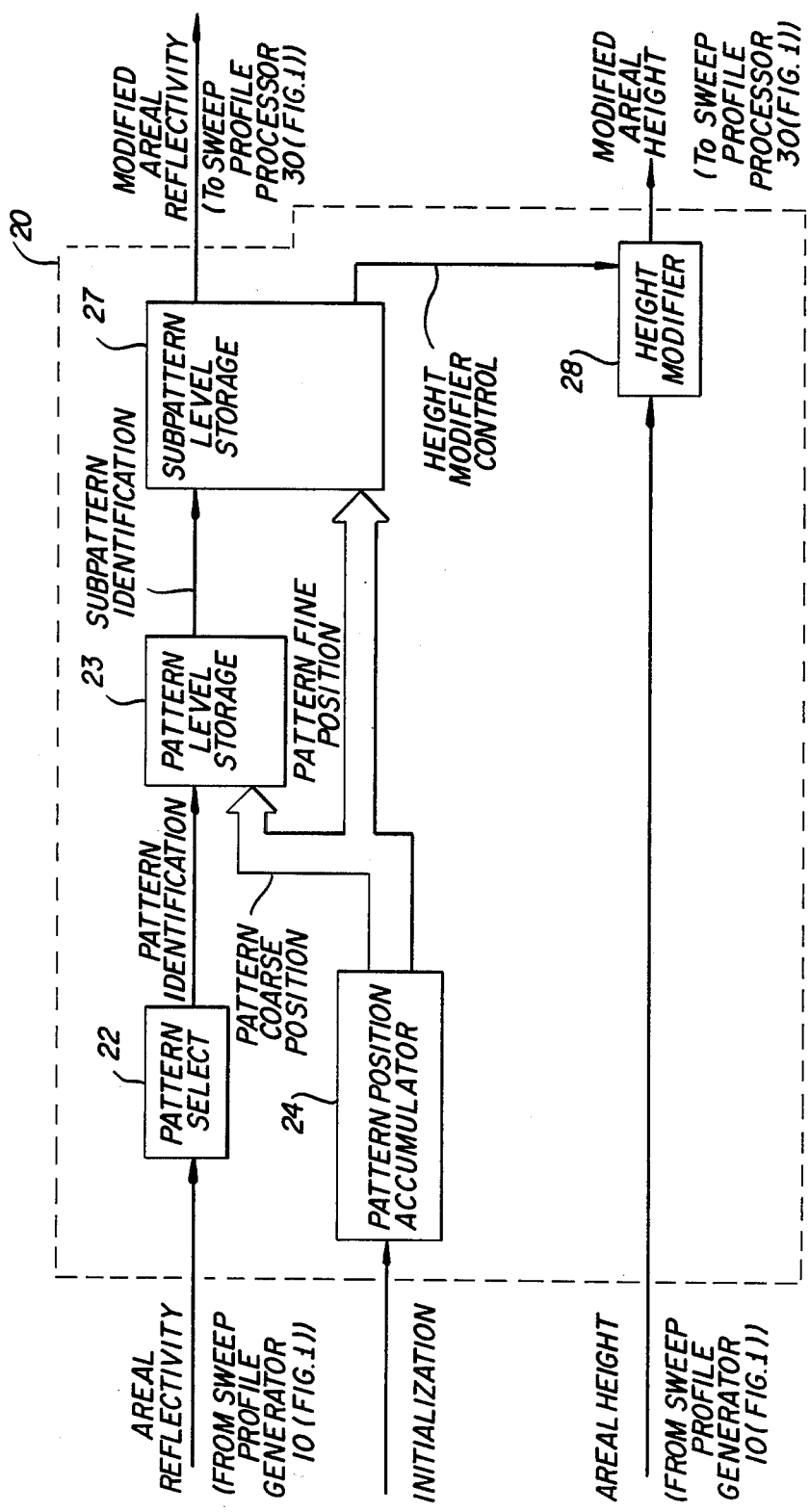
FIG. 4 is a block diagram of another configuration for the cell texture generator of FIG. 1 in accordance with the present invention.

Referring to FIG. 4, another embodiment of cell texture generator 20 in accordance with the present invention is shown. Like numbered elements are analogous to those illustrated and described with respect to FIG. 3.

The digitized pattern position signal from pattern position accumulator 24 is divided into predetermined most significant bits (MSB's), which are collectively designated the pattern coarse position signal that is supplied to a pattern level storage means 23 and into predetermined least significant bits (LSB's), which are collectively designated the pattern fine position signal that is supplied to a subpattern level storage means 27.

Cell texture generator 20 of FIG. 4 uses a two-level hierarchy to store cell patterns. Pattern level storage means 23, or first level, and sub-pattern level storage means 27, or second level, may each comprise a respective table look-up stored in a PROM or RAM. Pattern level storage means 23 supplies a sub-pattern identification signal to an input of sub-pattern level storage means 27 in response to the pattern coarse position and pattern identification signals provided to pattern level storage means 23.

Pattern level storage means 23 includes a plurality of arrangements of sub-patterns for a predetermined area, wherein each of the plurality of arrangements are stored in the PROM or RAM. Sub-pattern level storage means 27 includes a plurality of sub-patterns, wherein each of the plurality of sub-patterns are stored in the PROM or RAM. Sub-patterns are stored as grid representations having grid elements with reflectivity and height information analogous to patterns stored in pattern storage means 26 (FIG. 3). For example, some sub-patterns may be considered to be respective city blocks and one arrangement of sub-patterns may define an area of four square city blocks with the location and type of city block identified. The same sub-pattern may be used more than once. As a further example, a group of 16 subpatterns representative of environmental features that may be expected to be encountered may include four types of city blocks, three types each of residential blocks, agricultural areas and industrial areas, two types of forest areas and one grass field.

By way of analogy, the pattern coarse position signal defines a location that is analogous to designating a particular tile in an area that is represented by a plurality of contiguous tiles and the pattern fine position signal defines a specific location within a designated tile. For example, if the pattern coarse position signal designates a particular city block, then the pattern fine position signal may define the location of buildings within the block. In other words, sub-pattern level storage means 27 may be viewed as including information for defining a set of decorative tiles and pattern level storage means 23 may indicate the placement of those tiles over an area, wherein a specific tile may be used more than once.

Since memory size is related to the size of each pattern and the number of patterns that are to be stored, use of the embodiment shown in FIG. 4 results in smaller memory requirements for the combination of pattern level storage means 23 and sub-pattern level storage means 27 than for pattern storage means 26 (FIG. 3), because the same sub-pattern can be referenced in different locations of a pattern and/or in different patterns.

Sub-pattern level storage means 27 supplies a modified or enhanced areal reflectivity signal that is available at an output of cell texture generator 20 and a height modifier control signal to height modifier means 28, analogously to the signals available from pattern storage means 26 (FIG. 3). Height modifier means 28 supplies a modified or enhanced areal height signal that is available at an output of texture generator 20. The modified areal reflectivity and height signals are supplied to sweep profile processor 30 (FIG. 1) for processing as hereinbefore described.

Thus has been illustrated and described a landmass simulator for generating fine-detailed images including three-dimensional features for high resolution radar. Also shown and described is a simulator for generating stationary images without need to preprocess data or increase bulk storage medium size for the topographic data base.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for creating image data for defining images to be displayed in a radar image generation system, comprising:
   obtaining source data for defining a feature of an image to be displayed, wherein the source data include height and reflectivity information;
   modifying in real time the height and reflectivity portion of the source data in response to the value of the reflectivity of the source data; and
   providing the modified height and reflectivity portion of the source data for processing so that the images to be displayed may be developed.

2. The method as in claim 1, wherein the step of modifying includes varying the height and reflectivity portion of the source data in response to the location of a predetermined ground sample of a radar sweep.

3. In a radar image generation system, a method for simulating images to be displayed in response to a simulated radar position, comprising:
 obtaining source data for defining a feature of an image to be displayed, wherein the source data include height and reflectivity information;
 modifying in real time the height and reflectivity portion of the source data in response to the value of the reflectivity of the source data; and
 processing the modified height and reflectivity portion of the source data for generating the images to be displayed.

4. The method as in claim 3, wherein the step of modifying includes modifying in response to the location of a predetermined ground sample of a radar sweep.

5. The method as in claim 3, wherein the step of modifying includes:
 identifying one of a predetermined plurality of patterns in response to the reflectivity portion of the source data, wherein each of the predetermined plurality of patterns is representative of a respective areal type;
 selecting a predetermined portion of the one of the plurality of patterns in response to the location of a predetermined ground sample of a radar sweep; and
 varying the height and reflectivity portion of the source data in response to the selected predetermined portion of the one of the plurality of patterns.

6. The method as in claim 5, further including changing at least one of the plurality of patterns in real time for accommodating a change in the simulated radar position.

7. The method as in claim 3, wherein the step of modifying includes:
 identifying one of a predetermined plurality of patterns in response to the reflectivity portion of the source data and further in response to the location of a predetermined ground sample of a radar sweep;
 selecting one of a predetermined plurality of sub-patterns in response to the identified one of the predetermined plurality of patterns, wherein each of the predetermined plurality of patterns is representative of a respective arrangement of sub-patterns and further wherein each of the predetermined plurality of sub-patterns is representative of a respective terrain grid: and
 varying the height and reflectivity portion of the source data in response to the selected one of the predetermined plurality of sub-patterns and further in response to the location of the predetermined ground sample.

8. The method as in claim 7, further including changing at least one of the plurality of sub-patterns in real time for accommodating a change in the simulated radar position.

9. Apparatus as in claim 8, wherein the pattern select means and the pattern storage means include a respective random access memory.

10. In a radar image generation system, apparatus for simulating images to be displayed, comprising:
 cell texture generator means for modifying in real time the areal height and areal reflectivity portion of source data available from a source of data in response to the areal reflectivity portion, wherein the source data include areal height and reflectivity information for defining features includable in the images to be displayed; and
 sweep profile processor means coupled to the cell texture generator means, the sweep profile processor means for simulating the images to be displayed in response to the modified areal height and areal reflectivity portion of the source data.

11. Apparatus as in claim 10, wherein the cell texture generator means include:
 pattern storage means for storing a predetermined plurality of patterns, wherein each of the predetermined plurality of patterns is representative of a respective areal type; and
 pattern select means coupled to the pattern storage means, the pattern select means for identifying one of the predetermined plurality of patterns in response to the areal reflectivity portion of the source data, wherein the areal reflectivity and areal height of the source data are modified in response to the identified one of the plurality of patterns.

12. Apparatus as in claim 11, wherein the cell texture generator means further include pattern position accumulator means coupled to the pattern storage means, the pattern position accumulator means responsive to the location of a predetermined ground sample of a radar sweep for selecting a corresponding portion of the identified one of the plurality of patterns, wherein the areal reflectivity and areal height of the source data are modified in response to the selected corresponding portion of the identified pattern.

13. Apparatus as in claim 11, wherein the pattern select means and the pattern storage means include a respective programmable read-only-memory.

14. Apparatus as in claim 10, wherein the cell texture generator means include:
 sub-pattern level storage means for storing a predetermined plurality of sub-patterns, wherein each of the predetermined plurality of sub-patterns is representative of a respective terrain grid and include corresponding height and reflectivity information;
 pattern level storage means coupled to the sub-pattern level storage means, the pattern level storage means for selecting a predetermined one of the plurality of sub-patterns wherein the pattern level storage means includes a predetermined plurality of patterns, and further wherein each of the predetermined plurality of patterns is representative of a respective arrangement of sub-patterns;
 pattern select means coupled to the pattern level storage means, the pattern select means for identifying one of the predetermined plurality of patterns in response to the areal reflectivity portion of the source data; and
 pattern position accumulator means coupled to the pattern level storage means and to the sub-pattern level storage means, the pattern position accumulator means responsive to the location of a predetermined ground sample of a radar sweep for selecting a corresponding portion of the identified one of the plurality of patterns and for selecting a portion of the predetermined one of the plurality of sub-patterns wherein the areal reflectivity and areal height of the source data are modified in response to the selected portion of the predetermined one of the plurality of sub-patterns.

15. Apparatus as in claim 14, wherein the pattern select means, pattern level storage means and sub-pattern level storage means include a respective programmable read-only-memory.

16. Apparatus as in claim 14, wherein the pattern select means, pattern level storage means and sub-pattern level storage means include a respective random access memory.

* * * * *